United States Patent
Murken

(10) Patent No.: US 6,908,119 B2
(45) Date of Patent: Jun. 21, 2005

(54) DETACHABLE HOSE COUPLING WITH AN IMPROVED FEMALE AND MALE COUPLING HAVING AN INTERLOCKING U-SHAPED STAPLE

(75) Inventor: Joseph S. Murken, Springboro, OH (US)

(73) Assignee: Lewis-Goetz and Company, Inc., Pittsburgh, PA (US)

( * ) Notice: Subject to any disclaimer, the term of this patent is extended or adjusted under 35 U.S.C. 154(b) by 54 days.

(21) Appl. No.: 10/256,030

(22) Filed: Sep. 26, 2002

(65) Prior Publication Data

US 2004/0061331 A1 Apr. 1, 2004

(51) Int. Cl.$^7$ ................................................ F16L 37/00
(52) U.S. Cl. ........................ 285/305; 285/321; 285/39; 411/522
(58) Field of Search ................................ 285/403, 305, 285/321; 411/522, 529

(56) References Cited

U.S. PATENT DOCUMENTS

| | | | |
|---|---|---|---|
| 1,881,980 A | * | 10/1932 | Thomas, Jr. ................ 285/305 |
| 3,527,485 A | | 9/1970 | Coward et al. |
| 3,973,791 A | | 8/1976 | Porta et al. |
| 4,260,184 A | | 4/1981 | Greenawalt et al. |
| 4,431,218 A | | 2/1984 | Paul, Jr. |
| 4,723,796 A | * | 2/1988 | Nattel ........................ 285/305 |
| 4,923,350 A | * | 5/1990 | Hinksman et al. .......... 285/305 |
| 5,040,831 A | | 8/1991 | Lewis |
| 5,135,264 A | | 8/1992 | Elliot-Moore |
| 5,964,483 A | | 10/1999 | Long et al. |
| 6,290,263 B1 | | 9/2001 | Murken |

* cited by examiner

Primary Examiner—Aaron Dunwoody
(74) Attorney, Agent, or Firm—Lara A. Northrop, Esq.; Pietragallo, Bosick & Gordon

(57) ABSTRACT

A detachable hose coupling includes an improved female coupler piece. The female piece is generally cylindrical female sleeve piece having a pair of coaxially aligned bored open surfaces which are in opposing generally equidistant positions and displaced from a vertical plane passing through a central longitudinal axis of the female sleeve piece. A grooved surface extends partially into an outer surface of the female sleeve and extends between the bored open surfaces. A male piece is provided and a staple is provided for use in connecting the male piece to the female piece, wherein the staple fits through the bored open surfaces and seats in the grooved surface.

5 Claims, 3 Drawing Sheets

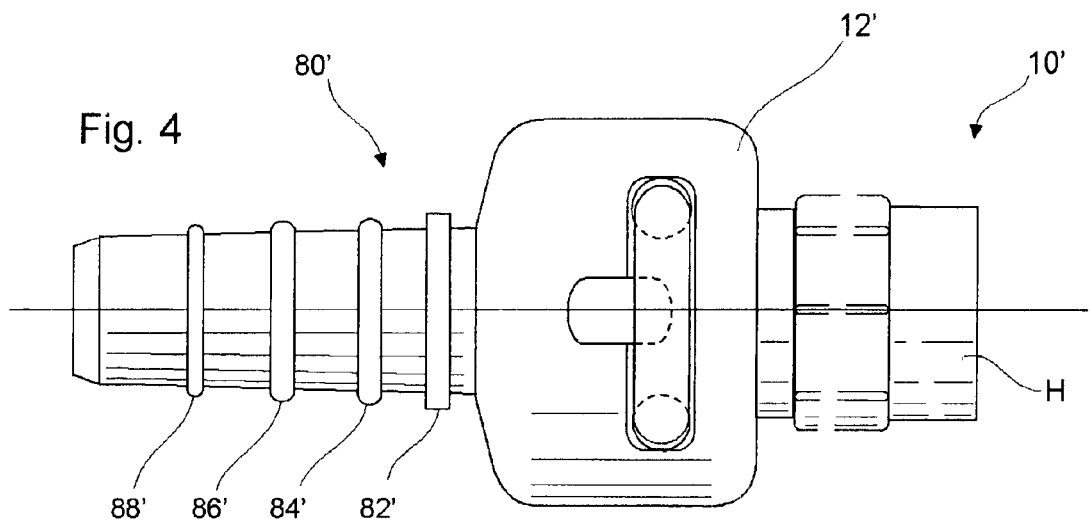
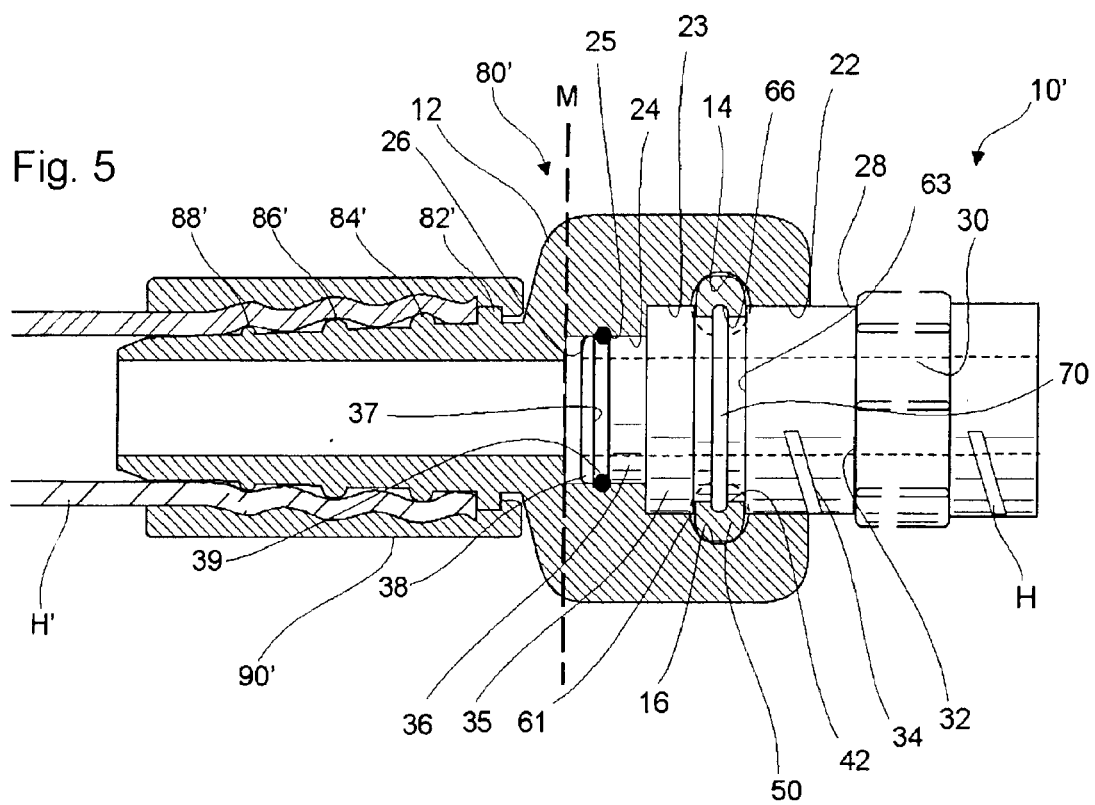

DETACHABLE HOSE COUPLING WITH AN IMPROVED FEMALE AND MALE COUPLING HAVING AN INTERLOCKING U-SHAPED STAPLE

BACKGROUND OF THE INVENTION

1. Field of Invention

The present invention relates to hose couplings. More particularly, the invention is directed to a detachable hose coupling with an improved female and male coupling having an interlocking U-shaped staple for use in mining applications.

2. Prior Art

The relevant prior art known is thought to be that of commonly owned U.S. Pat. No. 6,290,263 issued to Murken Sep. 18, 2001 for a detachable hose coupling having improved interlocking staple. The '263 patent provides some significant improvements over the art as stated therein. Disclosed therein is a detachable hose coupling having improved interlocking U-shaped staple, a female sleeve piece, a male piece of a size and configuration to permit insertion into the female sleeve piece, wherein the generally U-shaped staple has a cross-section with a peripheral surface which includes at least one radially recessed surface portion to permit a predetermined amount of fluid flow thereby when inserted into the male-female coupling.

Though the prior art improved upon the coupling designs in the mining field, there remains a need to improve detachable hose couplers. The present invention thus provides an improvement over the art.

SUMMARY OF THE INVENTION

It is an object of the invention to improve detachable hose couplings in the field of mining.

It is a further object to improve a female coupler for use with an interlocking U-shaped staple in a detachable male-female hose coupling.

Accordingly, the present invention is directed a detachable hose coupling having an improved female coupler piece. The coupling includes a generally cylindrical female sleeve piece having a pair of coaxially aligned bored open surfaces which are in opposing generally equidistant positions and displaced from a vertical plane passing through a central longitudinal axis of the female sleeve piece. A first grooved surface extends partially into an outer surface of the female sleeve and extends between the bored open surfaces. Further, a second grooved surface is formed in the outer surface of the female piece and intersects the first grooved surface. Preferably, the second grooved surface is slightly deeper than the first grooved surface. The female sleeve piece has a longitudinal axial open surface extending therethrough in communication with the bored open surfaces. The first grooved surface provides a first line of contact of a first predetermined configuration.

A generally cylindrical male piece is provided which is of a size and configuration to permit insertion into the female sleeve piece. The male piece has a longitudinal axial open surface extending therethrough and further has an end configured with an external recessed surface portion which when the male piece is inserted into the female sleeve piece is generally alignable with the bored open surfaces to provide an interconnecting open surface through the detachable hose coupling. The recessed surface is further defined to provide a second line of contact of a second predetermined configuration in the interconnecting open surface, and the bored open surfaces each provide a third and fourth lines of contact of a third and fourth predetermined configuration in the interconnecting open surface. Another end of the male piece is configured to fixably connect to a flexible hose.

A generally U-shaped staple is included and is configured with two opposing arms and an interconnecting transverse member. The arms are configured to be received through the bored open surfaces of the female piece and about the recessed surface of the male piece while the transverse member generally seats within the first grooved surface to interconnect the male and female piece along the lines of contact. The transverse member is preferably of a configuration such that when seated within the first grooved surface, the transverse member does not substantially extend beyond the outer surface of the female piece. The second grooved surface permits access between the transverse member and the first grooved surface to enable insertion of a pry tool there between and separation of the staple from the male and female pieces.

The staple includes a peripheral surface of a complementary configuration for suitably enabling contact along the lines of contact. The peripheral surface of the staple preferably includes at least one radially recessed surface portion to permit a predetermined amount of fluid flow thereby.

In another embodiment, the female sleeve piece includes an end configured to fixably connect to a flexible hose. Another end of the female sleeve piece is configured to receive the male piece as previously described.

BRIEF DESCRIPTION OF THE DRAWINGS

FIG. 4 is a side view of another embodiment of the present invention.

FIG. 5 is a side view of the embodiment in FIG. 4 shows a female piece in cross section.

DETAILED DESCRIPTION OF THE PREFERRED EMBODIMENTS OF THE INVENTION

Figure 1:
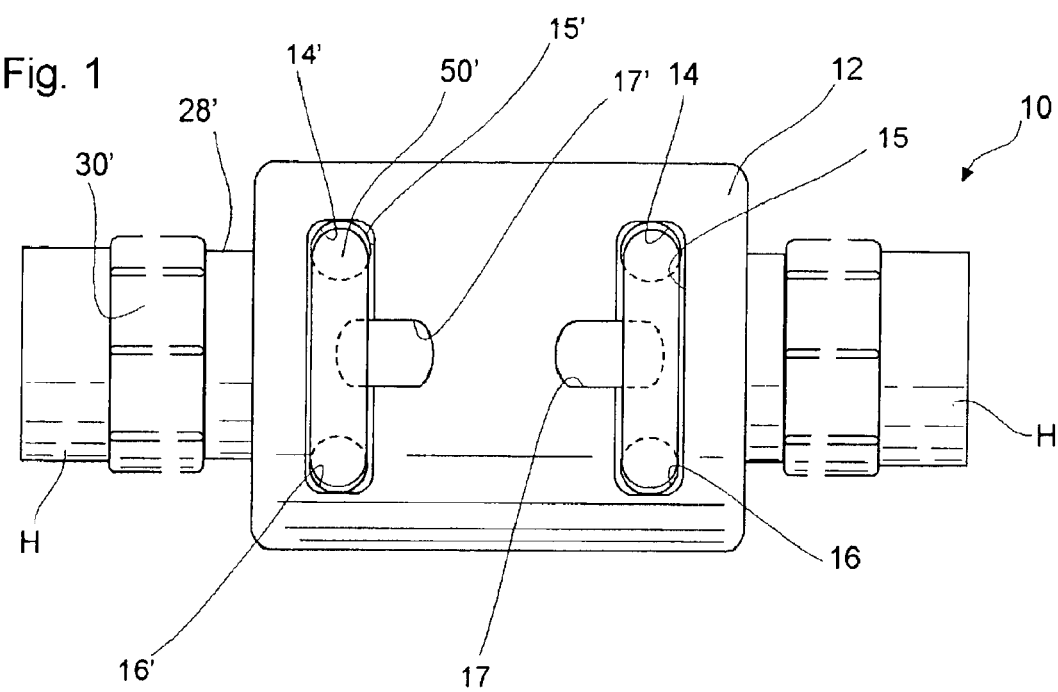
FIG. 1 is a side view of the present invention.

Referring now to the drawings, the detachable hose coupling is generally referred to by the numerals 10 and 10'. The embodiment in FIGS. 1–3 will be described first with respect to the coupling 10. FIGS. 4 and 5 depict the embodiment 10' and the numbers referenced thereon refer to parts when using like numbers those indicated in FIGS. 1–3. The hose couplings 10 and 10' of the type shown are for use in the mining industry to couple hydraulic fluid hose, but may have other uses.

The coupling 10 includes a generally cylindrical female sleeve 12 having a pair of coaxially aligned bored open surfaces 14 and 16 and which are in generally equidistant opposing positions about a vertical plane P passing through the center of a longitudinal axis A of the coupling 10 and are disposed at one end of the sleeve 12. Another pair of open surfaces 14' and 16' are disposed in a like manner at another end of the sleeve 12.

Further, the sleeve 12 has grooved surfaces 15 and 15' which extend partially into an outer surface of the sleeve 12 and extends between the bored open surfaces 14 and 16, and 14' and 16', respectively. Also, second grooved surfaces 17 and 17' are formed in the outer surface of the sleeve 12 and intersect respective grooved surfaces 15 and 15', here shown at about 90° on center. The orientation of the grooved surfaces 15 and 17, for example, can vary, but the particular orientation provides one exemplary access way and as will be apparent other variations may be employed. Also, grooved surface 17 is slightly deeper than the grooved surface 15 the reason for which will become apparent hereinafter.

The sleeve 12 includes a longitudinal inner open surface 20 which axially extends throughout the sleeve 12. The inner open surface 20 includes surface portions 22' and 23' about bored open surfaces 14' and 16', and reduced annular surfaces 24', 25' and 26' and all of which exist on both sides of the mid-line M, but only half are shown in the cut-away of FIG. 2.

Figure 2:
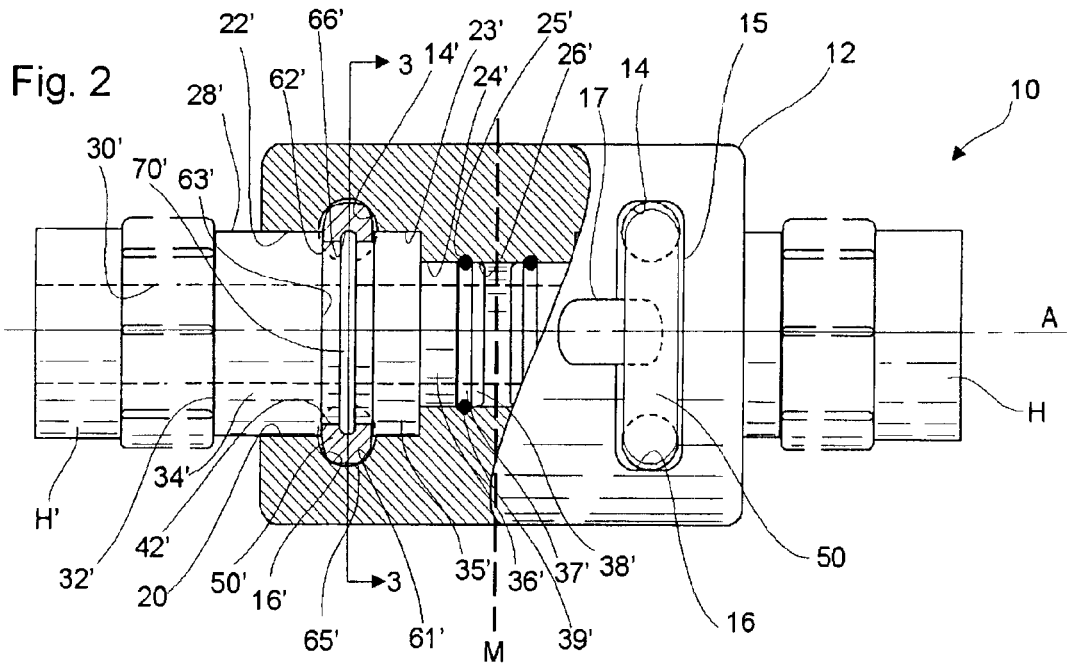
FIG. 2 is a side view of the present invention with a partial sectional cut-away.
Figure 3:
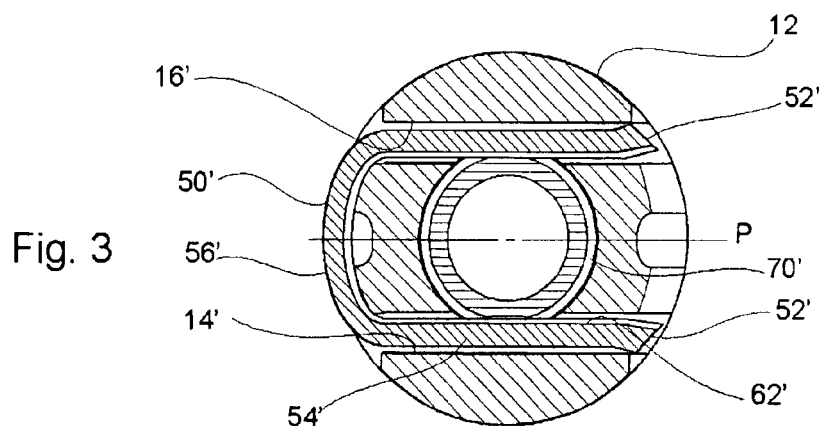
FIG. 3 is a cross-section through line 3—3 of FIG. 2.

The coupling 10 also includes a generally cylindrical male piece 28'. The piece 28', for example, has an open surface 30' axially extending longitudinally therethrough to permit fluid communication therethrough with hose H'. In FIGS. 1 and 2, two male pieces 28 can be employed in the sleeve 12. The male piece 28' has one end 32' connected to hose H'and another end 34' to be received approximately half way within the female sleeve 12. The end 34' includes external surface portions 35', 36', 37' and 38' which are of a lesser diameter than annular surfaces 23', 24', 25' and 26', respectively, to permit slidable receipt of the male piece 28' into the sleeve 12. An O-ring 39' is also provided and seats between surfaces 26' and 37'. The end 34' also includes an external cylindrical recessed surface 42' which, when the male piece 28' is inserted into the sleeve 12, generally aligns between the surface portions 22' and 23'.

As seen in FIGS. 1 and 2, two staples 50 and 50' are provided to interconnect the female sleeve 12 and male pieces 28'. The staples 50 and 50' can be generally U-shaped having slightly outwardly flared ends 52 and 52'. FIG. 2 depicts the recessed surface 42' including a radially protruding guide surface 70' on the male piece 28'.

It is contemplated that various configurations of the staple can be employed to carry out the invention and should be included in the scope of the appended claims. By way of example, a cross-sectional configuration of the U-shaped staple 50, 50' is preferably formed having an exterior surface configured with contact points minimizing brinelling of surface portions 61, 61' and 63, 63'. The configuration can be such to provide a suitable amount of fluid/air flow between the coupling sleeve 12, male piece 28' and the U-shaped staple 50', for example.

Here, the U-shaped staple 50' is shown configured with a cross sectional design having at least one linear flat surface 62' for disposal adjacent the cylindrical external recessed surface 42' of a male coupling piece 28' and has a radial arcuate surface 65' for disposal adjacent the generally arcuate surface 61'. As seen in FIG. 2, a radially recessed surface portion 66' is configured to receive the surface 70'. The staple cross section is preferably designed to permit a predetermined amount of fluid flow thereby.

The U-shaped staple 50' is configured with two opposing arms 54' and an interconnecting transverse member 56'. The arms 54' are configured to be received through the bored open surfaces 14' and 16' of the female piece 12 and about the recessed surface 42' of the male piece 28' while the transverse member 56' generally seats within the grooved surface 15' to interconnect the male piece 28' and female piece 12 along lines of contact between the grooved surface 15' and transverse member 56', arms 54' and bored open surfaces 14' and 16' and recessed surface 42'. The transverse member 56' is preferably of a configuration such that when seated within the 15' grooved surface, the transverse member 56' does not substantially extend beyond the outer surface of the female piece 12. In this regard, the depth of the grooved surface 15' should be sufficient to generally accommodate the receipt of the member 56'.

The intersecting grooved surface 17' is slightly deeper than the grooved surface 15' to permit access between the transverse member 56' and the first grooved surface to enable insertion of a pry tool, such as a flat head screw driver, there between in order to separate the staple 50' from the male piece 28' and female piece 12.

FIGS. 4 and 5 show another embodiment 10'. Here, the sleeve 12' includes like features described above on one side of the median line M and one its other side includes a male insert end 80' which includes a plurality of radial protruding surfaces 82', 84', 86' and 88' which aid in hose retention. The end 80' is tapered to ease insertion into hose H', which can be held on to the end 80' by a ferrule 90' which is crimped or otherwise mechanically locked about the hose H'.

The present invention provides for an increased plurality of lines of contact between the staple 50 and the male piece 28 and female sleeve 12, for example. The increased contact points further assure the retention between parts.

The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A detachable hose coupling, which comprises:
 a generally cylindrical female sleeve piece having a pair of coaxially aligned bored open surfaces which are in opposing generally equidistant positions and displaced from a vertical plane passing through a central longitudinal axis of the female sleeve piece, a first grooved surface extends partially into an outer surface of said female sleeve and extends between said bored open surfaces, and a longitudinal axial open surface extending through said female sleeve piece in communication with said bored open surfaces;
 a generally cylindrical male piece having a first end which is of a size and configuration to permit insertion into said female sleeve piece, a longitudinal axial open surface extending through said male piece and further having an external recessed surface portion which when said male piece is inserted into said female sleeve piece is generally alignable with said bored open surfaces to provide an interconnecting open surface through said detachable hose coupling, said male piece having a second end configured to fixably connect to a flexible hose;
 a generally U-shaped staple configured with two opposing arms and an interconnecting transverse member, wherein said arms are configured to be received through said bored open surfaces of said female piece and about said recessed surface of said male piece while said transverse member generally seats within said first grooved surface to interconnect said male piece and said female piece along lines of contact between said first grooved surface, said transverse member, said arms, said bored open surfaces and said recessed surface; and further including a second grooved surface which extends partially into an outer surface of said female sleeve and which intersects said first grooved surface to permit access between said transverse member and said first grooved surface in a manner to enable insertion of a pry tool there between for separation of said staple piece and said female piece, wherein said second grooved surface extends deeper into said outer surface of said female sleeve piece than the first grooved surface.

2. The detachable coupling of claim 1, wherein said transverse member is of a configuration such that when seated within said first grooved surface, said transverse member does not substantially extend beyond the outer surface of the female piece.

3. The detachable coupling of claim 1, wherein said U-shaped staple has a peripheral surface which includes at least one radially recessed surface portion to permit a predetermined amount of fluid flow thereby.

4. The detachable coupling of claim 1, wherein said female sleeve piece includes a first end configured to receive said male piece and a second end configured to fixably connect to a flexible hose.

5. The detachable coupling of claim 1, wherein said U-shaped staple has a generally D-shaped cross-section and has a radially recessed surface defined in a peripheral linear surface thereof.

* * * * *